United States Patent [19]

Ludikar

[11] 4,378,598
[45] Mar. 29, 1983

[54] MULTI-TERMINAL COMMUNICATIONS SYSTEMS SUITABLE FOR VEHICLE RADIO HARNESS

[75] Inventor: Peter J. Ludikar, Pinner, England

[73] Assignee: British Communications Corporation Limited, Bracknell, England

[21] Appl. No.: 187,135

[22] Filed: Sep. 15, 1980

[30] Foreign Application Priority Data

Sep. 15, 1979 [GB] United Kingdom ............... 7932051

[51] Int. Cl.³ .................................................. H04J 3/02
[52] U.S. Cl. ........................................ 370/86; 370/62; 370/77; 179/2 E
[58] Field of Search .................. 370/86, 62, 85, 77, 370/112, 24; 179/1 CN, 18 BC, 2 E, 2 EB; 375/60, 36

[56] References Cited

U.S. PATENT DOCUMENTS

| | | | |
|---|---|---|---|
| 3,806,807 | 4/1974 | Nakamura | 375/60 |
| 3,940,561 | 2/1976 | Heinze et al. | 370/86 |
| 3,943,284 | 3/1976 | Nelson | 370/24 |
| 4,268,722 | 5/1981 | Little et al. | 370/62 |
| 4,289,932 | 9/1981 | Reed | 370/62 |

FOREIGN PATENT DOCUMENTS

337896 11/1930 United Kingdom .
2002997A 6/1978 United Kingdom .

Primary Examiner—Douglas W. Olms
Attorney, Agent, or Firm—Leydig, Voit, Osann, Mayer & Holt, Ltd.

[57] ABSTRACT

A communications system is disclosed including a radio junction box controlling a number of radios and a number of crew boxes all linked by a ring circuit consisting of a single coaxial cable which provides both power supply and information. The various communication channels between the crew boxes and the radios and an intercom channel linking the crew boxes are provided by time division multiplexing. The microphone of each crew box is coupled to the coaxial line by a current generator. Each current therefore generates an appropriate voltage signal across the impedance of the cable which is assumed to be constant. Thus, when more than one crew box feeds current onto the line, the currents add and generate a correspondingly greater voltage signal on the line. Therefore, the attenuating effect which would take place if each crew box output were in the form of a voltage (in such a case each output would be loaded by the relatively low output impedance of the other voltage output or outputs on the line) is avoided. Time multiplexing of the crew boxes is therefore not required. Each signal transmitted on the line is pre-distorted to offset any distortion it will undergo upon transmission along the line. The signal received by each crew box is regularly clamped to effect signal separation and provide a known mean signal reference level.

20 Claims, 7 Drawing Figures

MULTI-TERMINAL COMMUNICATIONS SYSTEMS SUITABLE FOR VEHICLE RADIO HARNESS

BACKGROUND OF THE INVENTION

The invention relates to communications systems.

Communications systems are known involving a number of stations intended to be able to communicate with each other in which each station is connected to each other station by an individual cable link. Such systems involve an excessive number of cable links making them complex to instal and bulky in terms of space occupied by the cable links.

Communications systems are also known in which there is only a single cable link between all of the stations, each station being able to communicate with each other station via a respective one of a plurality of time-multiplexed channels. Where there are a large number of stations, however, this demands an excessive number of channels, making the time multiplexing process relatively complex.

It is an object of the invention to provide an improved communications system.

BRIEF SUMMARY OF THE INVENTION

According to the invention, there is provided a communications system, comprising at least three transmitters and a plurality of receivers and a common signal transmission path, each transmitter including a current generator which receives power from the path and is connected to feed onto the transmission path an analogue current transmitted whereby when two or more transmitters are simultaneously outputting signals to be transmitted to the respective current sum across the impedance of the transmission path thereby producing a voltage proportional to the sum, each receiver including means capable of responding to the voltage in the transmission path and thereby to receive the transmitted signals.

DESCRIPTION OF THE DRAWINGS

A communications system embodying the invention will now be described, by way of example, with reference to the accompanying diagrammatic drawings in which.

DESCRIPTION OF PREFERRED EMBODIMENTS

The communications system to be described is arranged to be used in a vehicle manned by a crew and carrying, for example, three two-way radios for communication between the vehicle and stations remote therefrom. The system provides each crewman with an adjacent crew box or terminal at his working position and these are linked to a junction box and thence to the three radios, so that each crewman can communicate through any of the three radios with each of the remote stations. He can also call and communicate with his fellow crewmen over an internal intercom channel. In the system to be described, each of the three radios is allocated a separate time multiplexed channel. While any of these channels is selected, however, any one or more of the crewmen can transmit or receive from the selected radio. Similarly, the intercom facility is allocated a fourth time multiplexed channel and when this is selected, any one or more of the crewmen can transmit or receive. In other words, the system does not require individual time multiplexed channels for each of the crew boxes. The manner in which this is achieved and yet requiring only a simple send and return cable connecting all the crew boxes and the junction box will be explained.

Figure 1:
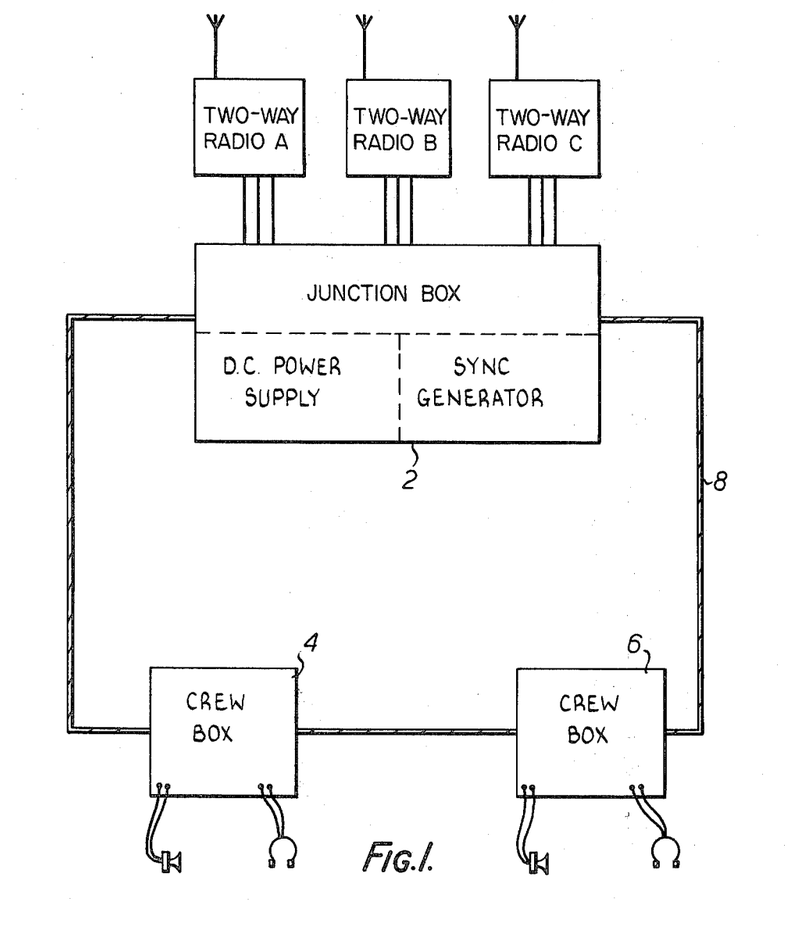
FIG. 1 shows a block circuit diagram of the system.

The system shown in FIG. 1 includes a radio junction box or unit 2 which is coupled to three two-way radios, Radio A, Radio B and Radio C, and two crew boxes 4 and 6. The three boxes 2 to 6 are linked by a line 8 consisting of a single coaxial cable 8, the central conductor being the signal transmission path and positive supply, and the outer screen acting as a ground return path. The coaxial cable 8 used can be regarded as a transmission line with matched impedances Z of, say 50 ohms at opposite ends.

Further crew boxes can be coupled to the line 8 as required without the need of significant alteration to the systems as will be explained.

The radio junction box includes a generator for feeding a D.C. supply current which is fed through the line 8 to each of the crew boxes to energise the circuitry in each of them. A constant current circuit, to be described below, in each crew box ensures that each crew box draws a constant current from the line 8 irrespective of its operative state. The junction box 2 also has a sync pulse generator which generates successive trains of sync pulses that are placed on the line 8. Advantageously the line voltage is 18 volts and the signal voltage may be of the order of 250 mV. Each train of sync pulses defines a series of time slots, each time slot being allocated to a specific communication channel in a manner to be explained. Certain communication channels are for digital data for controlling the system while others are for analogue signals such as audio signals as will now described in more detail.

Figure 2:
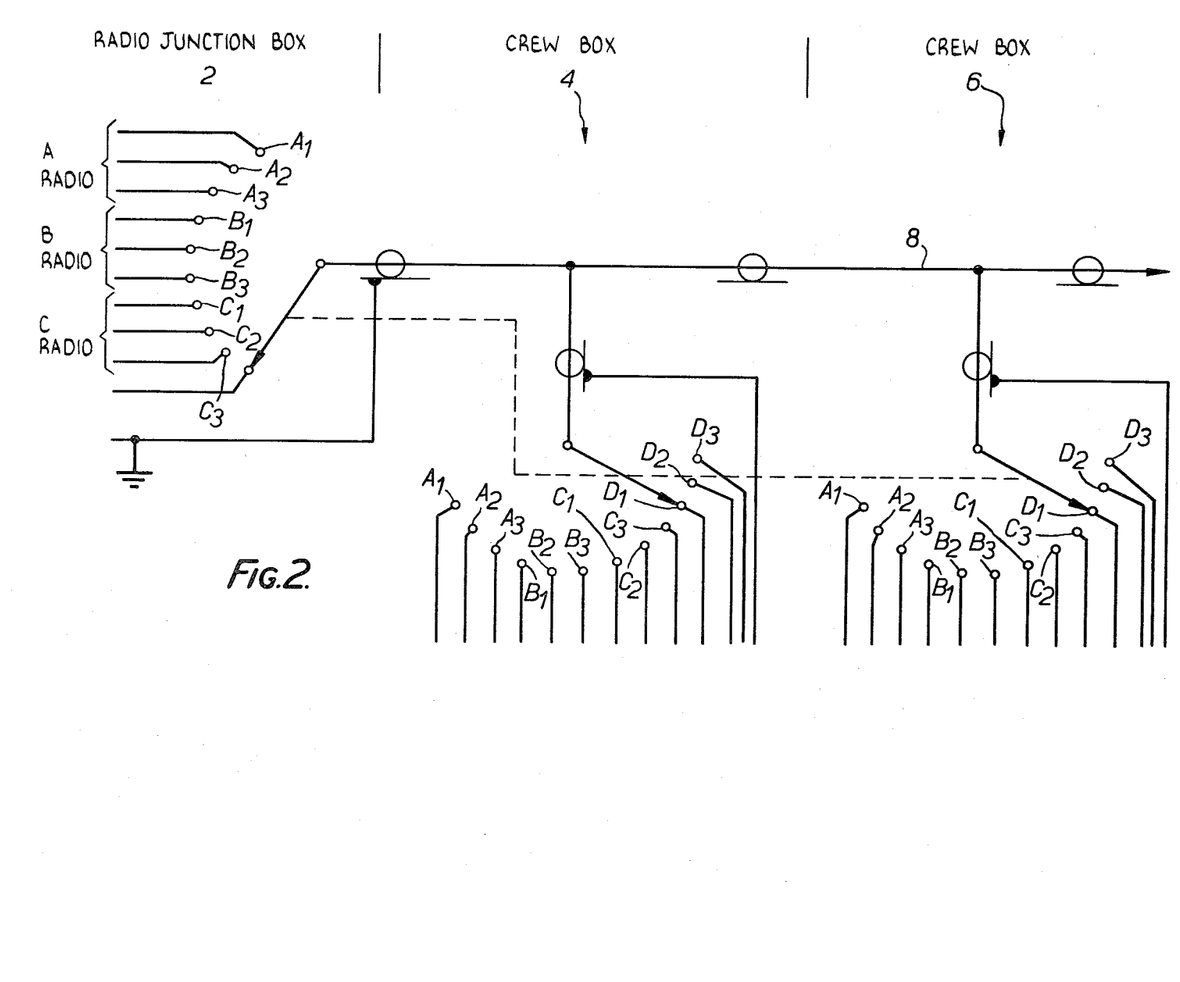
FIG. 2 is a schematic circuit diagram of a channel switching arrangement of the system of FIG. 1.

As shown in FIG. 2, each radio has three terminals. Thus Radio A has an earphone terminal $A_1$, a microphone terminal $A_2$ and a press to talk terminal $A_3$ for switching the radio between transmit and receive states. Radios B and C have similar sets of terminals $B_1$ to $B_3$ and $C_1$ to $C_3$.

Each crewman's box has twelve sets of terminals, nine terminals $A_1$, $A_2$, $A_3$, $B_1$, $B_2$, $B_3$, $C_1$, $C_2$, $C_3$ corresponding with respective ones of the three sets of terminals of the three radios and a further three terminals $D_1$ to $D_3$ associated with the common intercom. Terminal $D_1$ is the earphone terminal, $D_2$ is the microphone terminal and $D_3$ is the call terminal of the intercom.

Each of the crew boxes and the radio junction box incorporates an electric switch for connecting each terminal $A_1$ to $D_3$ in turn to the line 8. FIG. 2 illustrates this in terms of physical switches while in practice the channels are selected by a gating circuit triggered by appropriate gating pulses. By synchronising the operation of the switches, only similarly referenced terminals will be interconnected during each time slot and in this way by selecting a particular terminal (that is a particular time slot in each train of sync pulses) a crewman can select a particular communications channel.

Thus, for example, by selecting terminals $A_1$ to $A_3$ and coupling them respectively to his earphones, microphone and press to talk switch, a crewman can communicate with an outside station through Radio A.

During this time, for example, another crewman can communicate through Radio B, or even on Radio A (by sharing the channel with the first crewman). This multichannel communication system is in fact achieved by a time division multiplexing process which will now be described.

Figure 3:
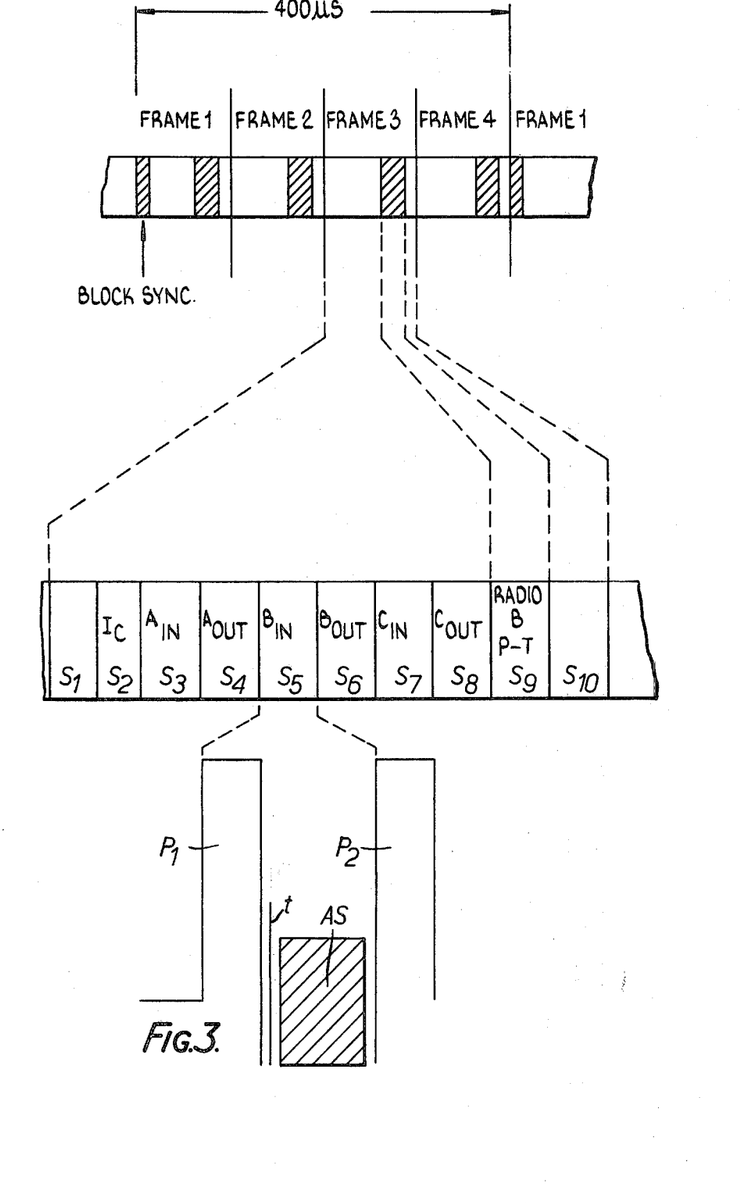
FIG. 3 is a timing chart illustrating the division of the system signals into separate time slots.

As shown in FIG. 3, the synchronising pulses define complete cycles of the time division multiplexing process. Each cycle is (in one example), 400 μS long and divided from the next cycle by a "block sync" pulse of greater length than the other sync pulses. Each cycle is notionally divided into four frames, each 100 μS long and each frame in turn is divided into ten time slots, with the beginning of each time slot being indicated by a respective sync pulse. The first, ninth and tenth slots (S1, S9 and S10) in each frame are allocated to digital control information while the second (S2) to the eighth (S8) time slots are allocated to analogue information. More specifically the second time slot S2 in each frame is allocated an intercom channel during which the crew boxes can communicate with each other. The third, fifth and seventh time slots S3, S5, S7 are allocated to receive signals from Radios A to C respectively, while the fourth, sixth and eighth time slots S4, S6, S8 are allocated to transmit signals to the three Radios A to C respectively. The first time slot S1 in Frame 1 carries the block sync pulse which is used in a manner to be described to synchronise all the crew boxes and the ninth time slot S9 in this frame is used to transmit a "CALL" signal to all the crew boxes for the intercom channel. In Frame 2, the first time slot S1 is spare and the ninth time slot S9 is for carrying a D.C. control level for the press to talk signal for Radio A. In Frame 3, the first slot S1 is spare and the ninth time slot S1 carries a D.C. control level for the press to talk signal for Radio B. In Frame 4, slot S1 is spare and slot S9 carries a corresponding D.C. level for Radio C. In each frame the tenth time slot S10 is spare. Slots S1 and S10 may be used for rebroadcasting purposes as will be explained.

In FIG. 3, the third frame is shown expanded with slot S2 allocated to the internal channel ($I_c$), slot 3 allocated to receive signals from Radio A ($A_{in}$), slot 4 allocated to transmit signals to Radio A ($A_{out}$), slots 5 to 8 allocated to Radios B and C in similar fashion, and slot 9 allocated to the press to talk signal (P-T) for Radio B. Also shown in FIG. 3 is a diagrammatic enlargement of slot slot S5 showing how its start is defined by a sync pulse P1 and its end by the following sync pulse P2. The analogue information transmitted in the time slot is shown diagrammatically at AS.

Figure 4:
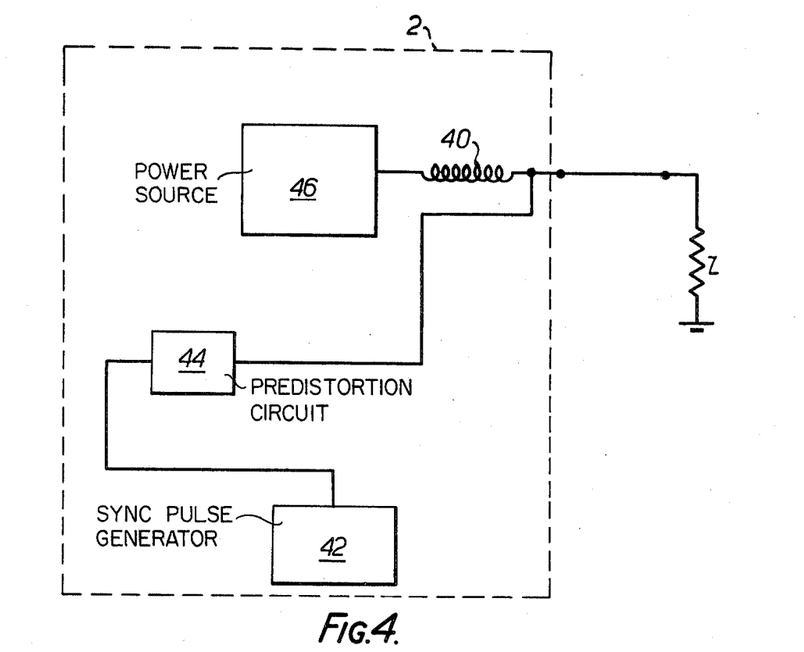
FIG. 4 is a block diagram of a radio junction box of the system of FIG. 1.

In the junction box 2, the sync pulses generated by a sync pulse generator 42 are coupled to the coaxial line 8 through a predistortion transconductance amplifier 44, see FIG. 4. A power source 46 feeds current onto the coaxial line through an inductor 40. The inductor 40 prevents the power supply from loading and distorting the audio signals on the line 8. In practice, however, physical space limitations may make it impossible to use an inductor sufficiently large to prevent all distortion and therefore both the sync pulses and the audio signals may suffer some distortion, particularly at low frequencies. In order to reduce the effect of this distortion on the sync pulses, the predistortion circuit 44 acts to distort each sync pulse by an amount to compensate for the distortion that it will suffer on the line 8 before it reaches a crew box. In this way each crew box receives a substantially undistorted signal.

Figure 5:
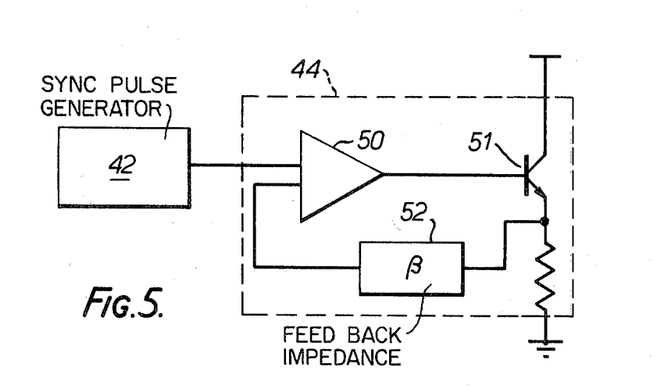
FIG. 5 is a block diagram of a pre-distorting circuit of the radio junction box of FIG. 4.

As shown in FIG. 5, the predistortion circuit 44 includes a differential amplifier 50. One input terminal receives a signal $V_{in}$ from the sync pulse generator 42 while the other input terminal is coupled to the emitter of a transistor 51 through a feedback impedance 52. The voltage across impedance 52 determines the output current Io. If the transfer function β of the feedback loop is made the same as the transfer impedance of the line 8, the transfer conductance of circuit 44 will be $(I_o/V_{in}) = 1/\beta$ The voltage on the line 8 will then be $V_c = I_o \cdot \beta$ or $V_c = V_{in}$, that is, the undistorted signal generated by the generator 42.

Figure 6:
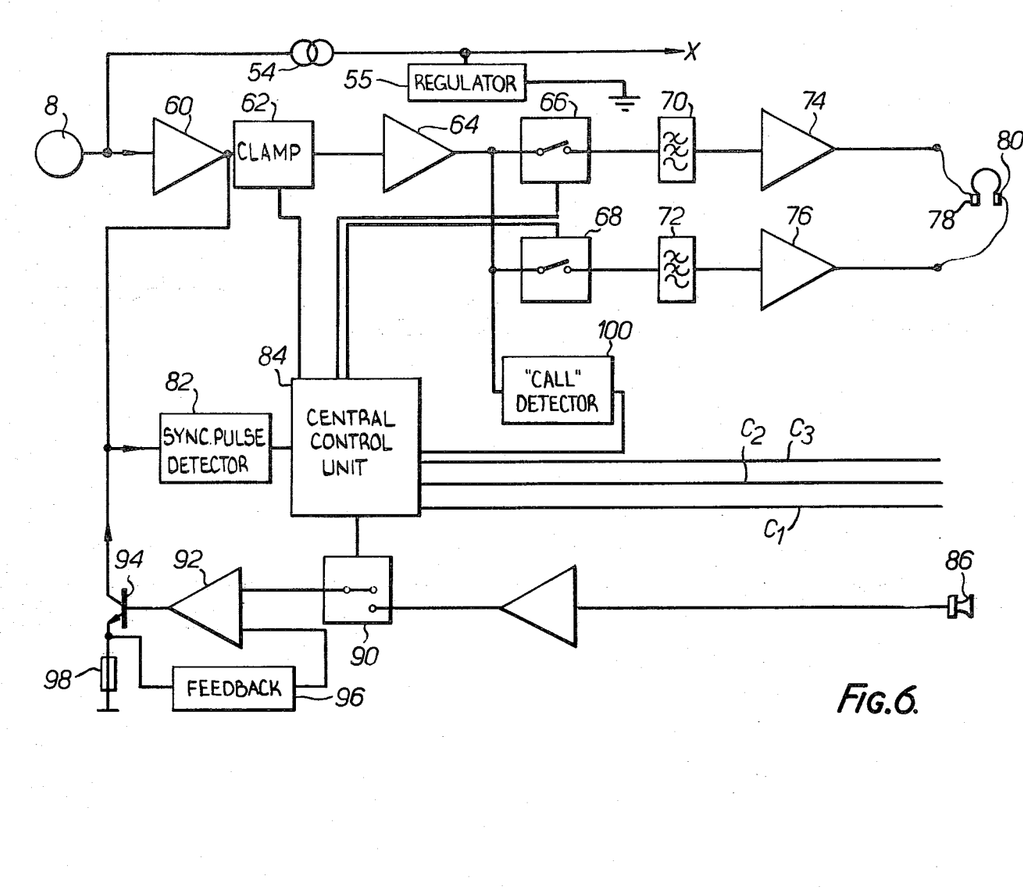
FIG. 6 is a block diagram of a crew box in the system.

The circuitry of each crew box is shown in FIG. 6. Power for the crew box is taken off the line 8 by a current take-off device 54 which feeds a fixed output current (e.g. of, say, 100 mA) to the units of the crew box (the connections to the units are indicated merely by the arrow X and are individually omitted for clarity). A shunt regulator unit 55 ensures that the fixed current (of 100 mA in this example) is always taken by the current take-off device 54. That is, if the units of the crew box are consuming less than 100 mA, the regulator 55 shunts more current to ground (i.e. the return path of the coaxial cable) to compensate.

In the crew box, a 20 dB buffer amplifier 60 receives audio signals from the line 8 and feeds them through a clamping circuit 62 to a 10 dB buffer amplifier 64. The amplifier 64 feeds two switching circuits 66 and 68 in parallel. Each switching circuit 66 and 68 feeds a respective earphone 78, 80 of a set of earphones through a corresponding filter 70, 72 and a corresponding amplifier 74, 76. Each amplifier 74, 76 is provided with a volume control adjustment facility.

A sync pulse detector 82 is also coupled to the output of amplifier 60 and feeds sync pulses to a central control unit 84. The central control unit includes counters which are reset at the beginning of each cycle (see FIG. 3) by the block sync pulse and then count the subsequent sync pulses which define the time slots of the cycle. The central control unit 84 is therefore able to emit control signals to the various units of the crew box at the appropriate time instants as will be explained.

A balanced microphone 86 drives a microphone amplifier 88 which in turn feeds a gating circuit 90. The gating circuit 90 which is controlled by the central control unit 84 drives a differential amplifier 92 which in turn drives the base of a transistor 94. The collector of the transistor 94 is connected to the coaxial cable 8, while the emitter is connected to ground through a resistor 98 and to the other input of the amplifier through a feedback circuit 96 having unity gain with compensation.

The arrangement of the amplifier 92, transistor 94 and feedback circuit 96 distorts the signal from the microphone by an amount equal and opposite to the distortion that the signal will undergo along the line (and as caused by inductor 40 as explained above in connection with FIG. 4) before it reaches a radio or another crew box. As a result, the signal will be received in a substantially undistorted state. The predistortion is effected in a manner similar to that described in conjunction with FIG. 5. The transistor 94 and its associated components therefore act as a current generator to place on the line 8 a current level dependent on the audio signal produced by the microphone 86.

The crew box has a two-line control channel C1 and control lines C2, C3 connected to controls by means of which the crewman can select a desired operating mode. Thus, by means of channel C1, the crewman can select "intercom" (enabling him to communicate with the other crew boxes), "Radio A", "Radio B" or "Radio C" (enabling him to transmit or receive via the selected radio). Channel C1 therefore energises the control unit 84 so that it gates out the appropriate enabling signals during the appropriate time slots.

Thus, for example, if the crewman selects Radio A by means of channel C1, the control unit 84 enables the switching circuits 66 and 68 during time slot S2 (see FIG. 3) so as to pass the audio signals to the earphones 78 and 80, and enables gating circuit 90 during time slot S4 so as to pass the audio signals to the line 8 from the microphone 86. Line C2 is the "press to talk" line by means of which the control unit 84 can be caused to feed the appropriate D.C. level on line 8 during time slot S9 of Frame 2 so as to activate Radio A. Line C3 is a CALL line by means of which the crewman can send a "call" signal to the other crew boxes via the intercom channel, and the control unit 84 therefore places the appropriate D.C. level on the line 8 during time slot S9 of Frame 1.

The output from the buffer amplifier 64 also feeds a call signal detector 100 which detects a "call" signal when generated on the line 8 by another crew box. When such a call signal is detected, the detector 100 sends a signal to the central control unit 84 which feeds enabling signals to the amplifier 76 to switch the amplifier to full volume thus overriding any setting of the volume control. As a result the intercom channel is received in the right earphone 80.

Figure 7:
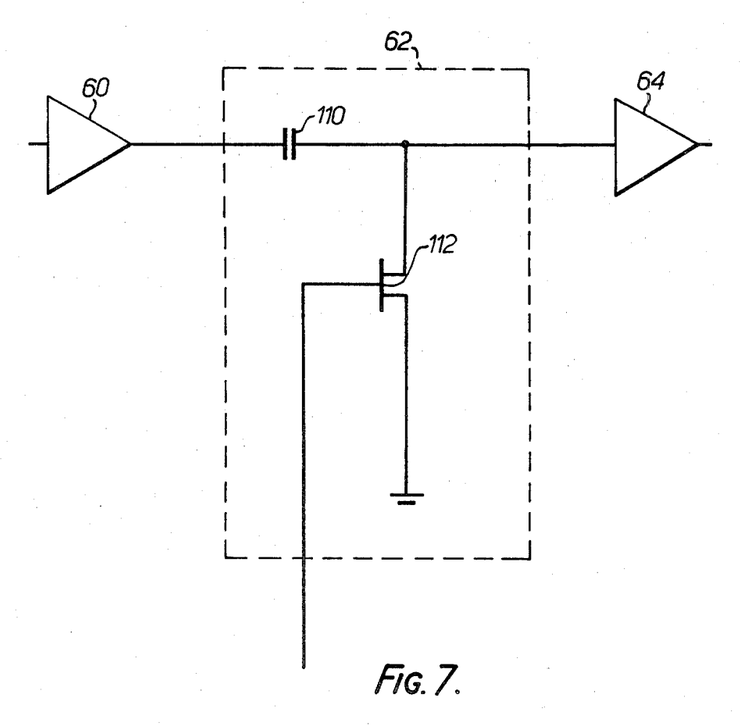
FIG. 7 is a circuit diagram of the clamping circuit of the crew box of FIG. 6.

The clamping circuit 62 is shown in more detail in FIG. 7.

The clamping circuit includes a capacitor 110 interconnecting the two buffer amplifiers 60 and 64 of FIG. 6. The junction between the capacitor 100 and the buffer amplifier 64 is connected through the main current path of a field effect transistor 112 to ground. The gate electrode of the field effect transistor is connected to the central control unit 84 to receive appropriately timed gating pulses therefrom.

In operation, the central control unit 84 produces a "clamp enable" signal on line 102 to the gate of the FET 112 in response to the leading edge of each sync pulse. This switches the FET on and sets the D.C. level of capacitor 110 to a known reference (e.g. ground). After the end of the sync pulse, but before receipt of any signal during that time slot, the control unit 84 switches the FET off and the capacitor 110 is therefore able to act as a coupling capacitor and pass the signal received during that time slot to the amplifier 64; FIG. 3 shows at t the time instant when the FET is switched off in slot 35 (and it is switched off at corresponding time instants in the other time slots). The effect of the clamping action, therefore, is that any offset due to preceding signals is minimised. Over one time slot the only signal to pass to the amplifier 64 is the information associated with the time slot, devoid of any sync pulse.

From the foregoing, it will be apparent that signals are placed on the line 8 as currents via current generators at the crew boxes and in the junction box. Each current therefore generates an appropriate voltage signal across the impedance of the cable which is assumed to be constant. Thus, when more than one crew box feeds current onto the line 8, the currents add and generate a correspondingly greater voltage signal on the line. In other words, the attenuating effect which would take place if each crew box output were in the form of a voltage (in such a case each output would be loaded by the relatively low output impedance of the other voltage output or outputs on the line) is avoided. Time multiplexing of the crew boxes is therefore not required.

It will be appreciated that the spare channels in the frames can be used for many purposes. One application is for controlling rebroadcast facilities. Thus one of the three radios can be selected to receive a signal from one remote station while another radio can be selected to rebroadcast the signal to another remote station. By applying appropriate digital signals to the spare channels, selection of the rebroadcast facility can be made from any outside station or any crew box with the aid of an additional rebroadcast unit coupled to the radio junction box. In such a case, signals in Frame B would be used to select Radio A as the rebroadcasting radio, and signals in Frames C and D would be used to select Radios B and C for rebroadcasting respectively.

What is claimed is:
1. A communications system, comprising
at least three transmitters and a plurality of receivers,
a common signal transmission path,
each transmitter including a current generator which receives power from the path and is connected to feed onto the transmission path an analogue current signal dependent on the signal to be transmitted whereby when two or more transmitters are simultaneously outputting signals to be transmitted the respective currents sum across the impedance of the transmission path thereby producing a voltage proportional to the sum,
each receiver including means capable of responding to the voltage in the transmission path and thereby to receive the transmitted signals.
2. A communications system, comprising
a plurality of transmitters and receivers
a plurality of two-way radios,
a common signal transmission path, and
control means for individually connecting the radios to the transmission path during respective time multiplexed time periods,
each transmitter including a current generator connected to feed onto the transmission path a current dependent on the signal to be transmitted whereby when two or more transmitters are simultaneously outputting signals to be transmitted the respective currents sum across the impedance of the transmission path thereby producing a voltage proportional to the sum,
each receiver and two-way radio including means capable of responding to the voltage in the transmission path and thereby to receive the transmitted signals,
and
the or each transmitter when operating to feed a said current onto the transmission path during each time period feeding the corresponding signal to the respective radio.

3. A system according to claim 2, in which the control means includes means connecting all the transmitters and receivers to the transmission path during further time multiplexed time periods whereby the or each transmitter which is operative to feed a said current onto the transmission path during those time periods feeds the corresponding signal to the receivers.

4. A system according to claim 3, in which
the control means defines repeated cycles of time slots, each cycle being divided into a fixed plurality of frames each consisting of a fixed plurality of the time slots,
and
in each frame some of the time slots are the time periods for which the said radios are respectively connected to the transmission path and one is the time period for which all the transmitters and all the receivers are connected to the transmission path.

5. A system according to claim 4, in which in at least some of the frames at least one other of the time slots is for transmitting control information on the transmission path to a particular one of the radios.

6. A system according to claim 5, in which the control information is represented by digital signals.

7. A system according to claim 4, in which
the time slots are defined by respective synchronising pulses produced by the control means, and
each transmitter and receiver includes means for recognising the synchronising pulses.

8. A system according to claim 7, in which
the cycles are defined by particular ones of the synchronising pulses, and
each transmitter and receiver includes means for recognising these particular synchronising pulses.

9. A system according to claim 7, in which the control means includes means for pre-distorting each synchronising pulse by an amount substantially equal and opposite to the distortion which it will suffer on the transmission path.

10. A system according to claim 7, in which each receiver includes means operative in response to each synchronising pulse defining a time slot for which any of the said radios or all the transmitters and receivers is or are connected to the transmission path to clamp the signal level received by that receiver to a reference level for the duration of that synchronising pulse.

11. A system according to claim 2, in which each transmitter includes means for pre-distorting the current which is feeds onto the transmission path by an amount substantially equal to and opposite to the distortion which it will suffer on the transmission path.

12. A system according to claim 2, in which the transmission path is a coaxial cable.

13. A communication system for use in a vehicle radio harness, comprising
a plurality of two-way radios,
a junction unit,
cable means connecting the radios to the junction unit,
a cable circuit, and
a plurality of operating terminals interconnected to each other and to the junction unit by the cable circuit.
each operating terminal including means for feeding communication signals onto, and receiving communication signals from, the cable circuit,
the junction unit being operative to generate signals defining repeated cycles each of n frames which are in turn each divided into a plurality of time slots which is the same for each frame, at least some of the time slots in each frame defining different communication channels which respectively permit communication between a particular one, only, of the radios and any one or more of the operating terminals.

14. A system according to claim 13, in which each operating terminal includes
a respective current generator which receives power from the cable circuit, and
means feeding to the cable circuit a current having a level depending on the communication signal to be placed on the cable circuit by that operating terminal, whereby to produce across the impedance of the cable circuit a voltage which is dependent on the algebraic sum of the currents produced by all the current generators.

15. A system according to claim 14, in which each operating terminal includes a pre-distorting circuit which is responsive to the current to be placed on the cable circuit by that operating terminal to pre-distort it by an amount substantially equal to the distortion that that current will undergo along the cable circuit.

16. A system according to claim 13, in which the corresponding communication channels in each frame are defined by the same serially numbered time slots in the frame.

17. A system according to claim 13, in which other time slots in each frame define respective channels for passing control information between the radios, the operating terminals and the junction box.

18. A system according to claim 13, in which each frame includes one time slot defining an intercom communications channel permitting communication between the operating terminals.

19. A system according to claim 13, in which the junction box includes means for generating synchronising pulses defining the time slots and for feeding them to the operating terminals on the cable circuit.

20. A system according to claim 19, in which the junction unit includes a pre-distorting circuit for pre-distorting each synchronising pulse by an amount substantially equal and opposite to the distortion that it will suffer on the cable circuit.

* * * * *

UNITED STATES PATENT AND TRADEMARK OFFICE
CERTIFICATE OF CORRECTION

PATENT NO. : 4,378,598
DATED : March 29, 1983
INVENTOR(S) : Peter J. Ludikar

It is certified that error appears in the above—identified patent and that said Letters Patent is hereby corrected as shown below:

Column 1, line 33, after the word "current" insert -- dependent on the signal to be --.

Column 7, line 52, delete the word "is" and insert -- it --.

Signed and Sealed this

Nineteenth Day of July 1983

[SEAL]

Attest:

GERALD J. MOSSINGHOFF

Attesting Officer

Commissioner of Patents and Trademarks